Nov. 27, 1951   J. E. WILLIAMS, JR   2,576,659
TEMPLE RULER
Filed Oct. 12, 1950
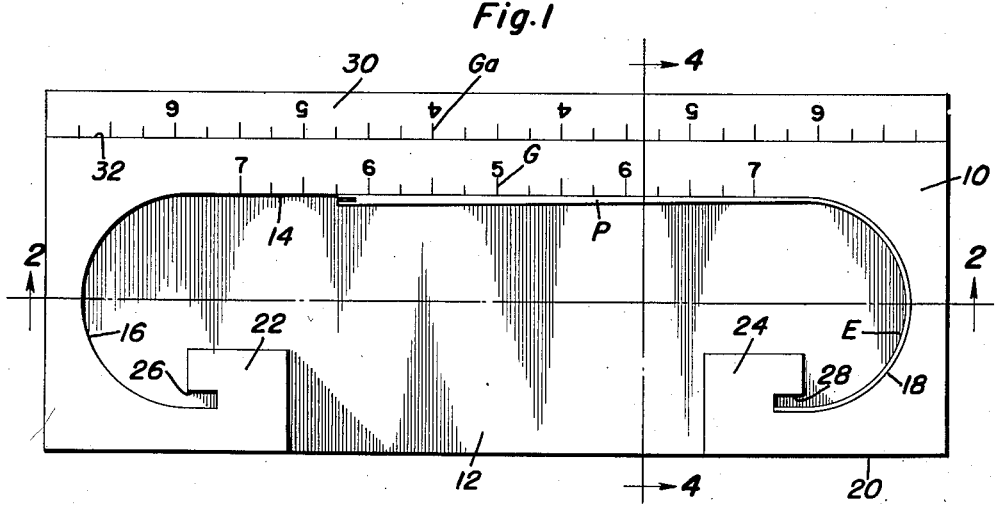
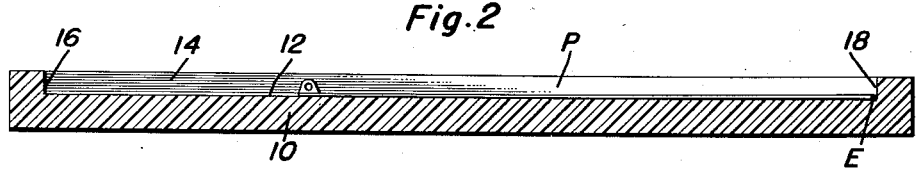
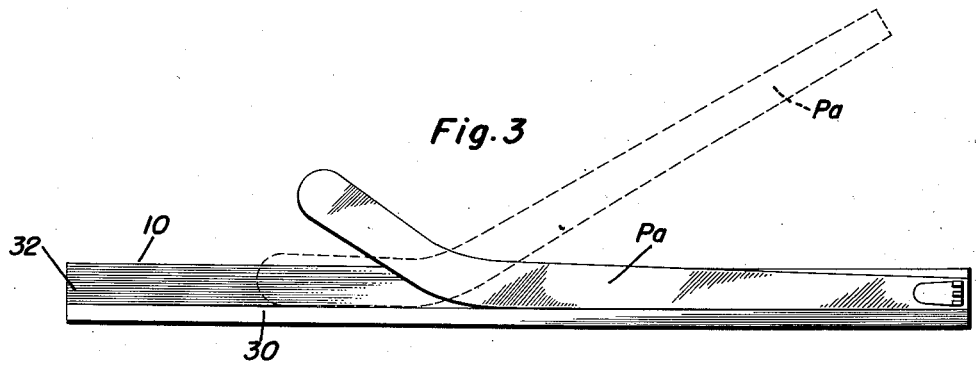
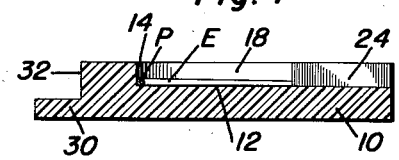
Inventor
*James E. Williams, Jr.*
By *Clarence A. O'Brien and Harvey B. Jacobson*
Attorneys Patented Nov. 27, 1951

2,576,659

UNITED STATES PATENT OFFICE 2,576,659

TEMPLE RULER

James E. Williams, Jr., Hillsboro, Ohio

Application October 12, 1950, Serial No. 189,789

2 Claims. (Cl. 33—200)

This invention relates to new and useful improvements in measuring devices and the primary object of the present invention is to provide an optometrist ruler whereby the length of temple or ear pieces may be quickly and readily determined.

Another important object of the present invention is to provide a temple ruler so constructed as to permit the measurement of the length to the bend as well as the total length of shell frame temples or ear pieces without the necessity of removing the frame temples from the eye glass frame.

A further object of the present invention is to provide a temple ruler that may be made from wood, metal, plastic or such suitable material for quick and accurate measurement of the temple length or rigid temple or ear pieces by optometrists, ophthalmologist, oculist, ophthalmic laboratories, and by dispensing opticians or by anyone who often measures cable and rigid temple lengths.

A still further aim of the present invention is to provide a temple rule that is simple and practical in construction, strong and reliable in use, efficient in operation, inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a plan view of the present invention and showing a temple piece or ear piece being positioned on the invention for measuring.

Figure 2 is a longitudinal vertical sectional view taken substantially on the plane of section line 2—2 of Figure 1.

Figure 3 is an elevational view showing how a rigid temple piece is measured by the present invention; and Figure 4 is a transverse vertical sectional view taken substantially on the plane of section line 4—4 of Figure 1.

Referring now to the drawings in detail, wherein for the purpose of the illustration, there is disclosed a preferred embodiment of the present invention, the numeral 10 represents an elongated substantially rectangular base member whose upper face is provided with an elongated recess 12 including a straight longitudinal wall 14 and concave end walls 16 and 18 that meet the ends of the wall 14.

The recess 12 is provided in one longitudinal side edge 20 of the base member 10 and a pair of lugs or abutments 22 and 24 forming part of the base member projecting laterally from the edge 20 into the recess 12 adjacent and between the concave walls 16 and 18. These lugs 22 and 24 are provided with notches or slots 26 and 28 that form continuation of the end walls 16 and 18.

The upper face of the base member 10 is provided with graduations G in quarter, half and full inches so that curved end E of a temple or ear piece P rests against one of the end walls 16 or 18 with the outer extremity of the piece P in the notch 26 or 28, the straight portion of the piece P will be against the wall 14 and the length of the piece P may be determined by observing the graduation G.

The temple piece P shown in Figures 1, 2 and 4 is of the cable type and there is also provided a means whereby the measurement of the length to the bend as well as the total length of the shell frame temple pieces. Pa of the rigid type may be obtained. This means consists of a longitudinal step or shelf 30 that is integrally formed with the longitudinal edge 32 of the base member 10. The upper face of the step 30 is provided with graduations Ga in quarter, half and full inches.

The hinged end of the temple piece Pa is aligned with one end of the base member 10 and at the same time, the temple piece Pa is pressed firmly against the edge 32 and the upper face of the step 30 and raised as shown by dotted lines in Figure 3. The total length of the temple piece Pa is then determined by noting the point on the scale Ga corresponding to the end of the temple piece.

The scales G and Ga are so designed as to permit right or left temple pieces to be measured without removal from their eyeglass frames.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An optometrist ruler comprising an elongated flat base having an upper face, said upper face having an elongated recess therein including a straight longitudinal wall and a pair of concave end walls meeting the ends of the straight wall, a pair of lugs forming part of the base and extending into the recess adjacent the end walls and lugs being located between the end walls and having notches thereon in registry with the end walls, and graduations on the upper face of said base along said straight wall.

2. An optometrist ruler comprising an elongated flat base having an upper face, said upper face having an elongated recess therein including a straight longitudinal wall and a pair of concave end walls meeting the ends of the straight wall, a pair of lugs forming part of the base and extending into the recess adjacent the end walls and lugs being located between the end walls and having notches thereon in registry with the end walls, graduations on the upper face of said base along said straight wall, a longitudinally extending step along one side edge of the base and additional graduations on the step.

JAMES E. WILLIAMS, JR.

REFERENCES CITED

The following references are of record in the file of this patent:

UNITED STATES PATENTS

| Number | Name | Date |
| --- | --- | --- |
| 987,315 | Nero | Mar. 21, 1911 |